3,404,128
METHOD FOR PREPARING A DIPHENOLIC ACID-AMIDE PHENOL-ALDEHYDE RESIN
Sol B. Radlove, Abraham Ravve, and Chester W. Fitko, Chicago, Ill., assignors to Continental Can Company, Inc., New York, N.Y., a corporation of New York
No Drawing. Filed June 4, 1965, Ser. No. 461,546
11 Claims. (Cl. 260—51.5)

ABSTRACT OF THE DISCLOSURE

A diphenolic acid coating resin is prepared by reacting a diphenolic acid amino amide with a polyfunctional phenol and formaldehyde, the diphenolic acid amino amide being prepared by the reaction of a polyamine and a diphenolic acid, the polyamine being present in excess of the stoichiometric amount required to react with the diphenolic acid. A thermosetting polymeric coating composition is prepared by reacting the diphenolic acid coating resin with an epoxy resin.

---

This invention is directed to a method of preparing a polymeric coating composition and more specifically to a method of preparing a diphenolic acid coating resin and to its use in combination with an epoxy resin as a coating composition for various substrates, such as metal. Still more specifically, this invention is directed to a composition comprising diphenolic acid resins in combination with epoxy resins and to the method of using these compositions for preparing thermosetting coatings on metal surfaces. The diphenolic acid resins, as prepared in accordance with this invention, can be used either alone or in combination with known epoxy resins, and have been found to be particularly useful for the formation of coatings on metal surfaces, such as the interior of cans. Coating compositions containing the diphenolic acid resins of this invention have been found to provide a flexible, adherent film on metal surfaces and are particularly outstanding with respect to their resistance to chemicals.

Heretofore, attempts to use diphenolic acid compounds, and more particularly the diamides of diphenolic acid, for the preparation of good coating compositions, have not proven to be completely satisfactory. However, these diphenolic acid compounds and particularly the polyamides thereof have been utilized for preparing thermoset coatings. More particularly, the use of diphenolic acid terminated polyamides reacted with formaldehyde either alone or in combination with phenols may have been suggested as a means of preparing thermosetting coatings. However, in prior compositions the diphenolic acid polyamide is a completely amidified product in which there are no free primary amino groups available to react with either the phenol or the aldehyde. Thus, most of these compositions form films which are very hard and less flexible because of the type of cross-linking.

To overcome the insufficiencies of coatings of similar compositions known heretofore, it has been found that it is essential to prepare the diphenolic acid amides by utilizing an excess of the polyamine so as to obtain a product which is a mixture of both the mono-amino amide and the diamide of the diphenolic acid. Moreover, the polyamines used in preparing the amides must have two primary amine groups and must be used in an amount ranging from about 5–100% and more preferably 40–100% in excess of the theoretical stoichiometric amount required to form the diamide of the polyamide. Thus, by utilizing, for example, 100% in excess of the polyamine normally required to form the diamide of the polyamine, it is possible to obtain amides of the diphenolic acid which comprises a mixture of the mono-amino amide and diamide wherein the mono-amide is substantially prevailing. It has been found that it is partially the unreacted primary amine groups of the mono-amides which are subsequently reacted in the condensation of the polyfunctional phenol and formaldehyde which bond the diphenolic acid amides to the thermosetting resin and thus provide a continuous adherent coating which is highly flexible and substantially resistant to chemicals. The diphenolic acid mono- and di-amides are sufficiently bonded to the phenolic-resin system so as to result in a homogeneous composition which is uniform throughout and can be used effectively for preparing thermosetting films.

One of the essential elements of this invention is that it is necessary to prepare the amide from polyamines and diphenolic acids wherein the polyamine contains two primary amine groups, one of which remains unreacted after the amidification and is available to react in the subsequent condensation with the phenol and formaldehyde. The unreacted or unbound primary amino group of the mono-amide is obtained in relative large proportions by utilizing in excess of the polyamine which must contain two primary amine groups. The excess ranges from about 5–100% over the stoichiometric amount required to form the diamide.

The diphenolic resins which are obtained from the reaction of these diphenolic acid amides with phenol and formaldehyde may be used in combination with an epoxy resin to obtain coatings which are substantially superior to similarly known coating compositions. The coatings prepared in accordance with the teachings of this invention have outstanding physical and chemical properties and have demonstrated that the resin forms tough, flexible films which are highly resistant to oxidation, acids, alkali constituents and various other organic solvents. These coatings are highly adherent to various surfaces, including metal, plastics, etc. and, therefore, can be used for forming films on articles which require a high degree of flexibility and outstanding chemical resistance.

Accordingly, it is an object of this invention to provide a method of preparing a diphenolic resin containing mono-and diamides of a diphenolic acid. Still further, it is an object of this invention to provide a method of preparing diphenolic resins containing mono-and diamides of diphenolic acid reacted with formaldehyde and a polyfunctional phenol.

It is another object of this invention to provide a method of preparing diphenolic resins containing a mixture of mono- and diamides of a diphenolic acid which can be used for preparing a thermosteering composition which is highly adherent to various surfaces, particularly metal, and is substantially resistant to corrosive chemicals. Still a further object of this invention is to provide a diphenolic acid resin composition prepared by condensing a polyfunctional phenol with formaldehyde and a diphenolic acid amide wherein the diphenolic acid amide is prepared by reacting the acid with an excess of a polyamine containing two primary amine groups.

It is another object of this invention to provide a composition containing a diphenolic resin in combination with an epoxy resin solubilized in inert-volatile organic solvents which may contain pigments or other known vehicles; said diphenolic resin being prepared by condensing a polyfunctional phenol with mono- and diamides of a diphenolic acid and formaldehyde.

It is still a further object of this invention to provide a method of coating various substrates, including metal, with a thermosetting resin composition which may be cured at temperatures ranging up to about 500° F.

It is still a further object of this invention to provide a method of providing a metal substrate containing a thermosetting coating composition which comprises a particular diphenolic resin in combination with an epoxy resin.

It is still a further object of this invention to provide a method of preparing a continuous, adherent coating composition which is highly flexible and substantially resistant to various chemicals and which comprises a combination of an epoxy resin and a particular diphenolic resin; the diphenolic resin being prepared by condensing formaldehyde with a polyfunctional phenol and a diphenolic acid amide, said amide being obtained by amidifying a diphenolic acid with an excess of a polyamine containing two primary amine groups.

It is still a further object of this invention to provide a thermosetting composition and a method of preparing same for use as a coating on various metal surfaces which comprises the combination of an epoxy resin and a diphenolic resin; the diphenolic resin being prepared by condensing a phenol with formaldehyde and a diphenolic acid mono- and diamide.

These and other objects of the invention will become apparent from a further and more detailed discussion of the invention.

More specifically, it has been discovered, quite unexpectedly, that continuous-adherent thermosetting coating films can be obtained by utilizing a particular diphenolic resin in combination with an epoxy resin solubilized in inert volatile organic solvents. The amount of solvent will depend on the desired viscosity needed to obtain a liquid coating composition which can be applied to various surfaces, particularly metal, and baked at temperatures ranging up to about 500° F. The primary constituent of the coating composition of this invention comprises the diphenolic resin which is prepared by condensing a polyfunctional phenol with diphenolic acid mono- and diamides and formaldehyde.

DIPHENOLIC RESIN

The diphenolic resins are prepared by condensing a polyfunctional phenol with diphenolic acid mono- and diamides and a sufficient amount of formaldehyde to obtain a condensation product which can be used as a thermosetting coating composition, either alone or in combination with other known coating materials, such as the epoxy resins. The diphenolic acid amides can be obtained, for example, by reacting a diphenolic acid, such as 4,4-bis(4-hydroxyphenyl) pentanoic acid with an excess amount of a polyamine containing two primary amine groups.

It is an essential and critical feature of this invention that in preparing the diphenolic acid amides, that the amount of polyamine used is an excess of that amount stoichiometrically needed to form the diamide of the polyamine. The excess amount may range from about 5–100% and preferably 40–100% over and above the amount normally required to form the diamide of the polyamine. Thus, for example, where 4,4-bis(4-hydroxyphenyl pentanoic acid is used to amidify the diamine, e.g., ethylene diamine, the amount of ethylene diamine normally required for reaction of both of the primary amine groups to form the diamide would be approximately 0.5 mole of the diamine to 1.0 mole of the pentanoic acid. By utilizing an excess or, in other words, one mole of the ethylene diamine per mole of the pentanoic acid, for example, it is possible to obtain an amide which is a combination of a mono-amino amide and the diamide, thus leaving at least one unbound or unreacted primary amine group for the subsequent reaction with the polyfunctional phenol and formaldehyde. It is the presence of the unbound or free primary amine groups in the macromolecules of the thermosetting polymer which has been found to be essential for the preparation of coatings in accordance with this invention. Accordingly, it is possible to obtain films which have greater continuity, are completely homogeneous, highly flexible and have outstanding chemical and physical properties.

DIPHENOLIC ACID AMIDES

In preparing the diphenolic acid amides for purposes of this invention, it is essential that the polyamine have two primary amine groups per molecule such that upon amidifying the polyamine with the diphenolic acid, at least one of the said primary amine groups remains unreacted in the form of a mono-amino amide. The relative proportion of the mono-amino amide with the diamide adducts will obviously depend upon the amount of excess used in the amidification process. Thus, for example, where 100% of an excess of polyamine having two primary amine groups us used in the amidification of the diphenolic acid, it is possible to obtain a mixture of mono-amino amides and the diamide adducts wherein the mono-amino amide ranges from about 70–90% of the mixture. On the other hand, if only a stoichiometric amount of a polyamine is used in the amidification process, all of the primary amino groups would be completely reacted, thus leaving no free or unbound primary amine groups for the subsequent reaction with the phenol and formaldehyde.

A number of polyamines which have two primary amine groups may be used and include such compounds as ethylene diamine, diethylene triamine, triethylene tetramine, tetraethylene pentamine, 1,3 - diamino propane, imino - bis - propyl amine, N,N - bis (3 - aminopropyl) methylamine, hexamethylene diamine, propylene diamine, trimethylene diamine, tetramethylene diamine, propane diamine, p-phenylene diamine, 1,2 - tetramethylene diamine, and other low or high molecular weight polyamines which contain two primary amine groups.

The amines may be prepared, for example, by reaction of ammonia with an alkyl halide. The primary, secondary and tertiary amines being separated conveniently by their differences in boiling point or by extraction. The low molecular weight aliphatic polyamines are usually obtained as aqueous solutions and may be used as such, thus avoiding the necessity of having to remove water. The high molecular weight polyamines are usually prepared from polymerized fatty acids, e.g., the dimer acids of long-chain fatty acids such as soya bean and linseed oil fatty acids. Here, ammonia is reacted with the polymerized fatty acids through a liquid or vapor phase to form the nitrile which is then hydrogenated to form the amine. This process results in a mixture of primary and secondary amines which are difficult to separate. Therefore, the preferred method is that of reacting ammonia with the polymerized fatty acid to form the amide and subsequently degrading the amide to the amine by the Hoffman reaction. In addition to the aliphatic amines, the aromatic polyamines containing two primary amine groups may be used with satisfaction. These polyamines include, for example, such compounds as phenylene polyamine wherein the aromatic hydrogens are replaced by amino groups or organic radicals containing amino groups, such as p-phenylene diamine, and diamino diphenylamine.

The mono- and diamides of this invention, hereafter referred to as amides, are prepared by reacting the polyamine containing two primary amine groups with a diphenolic acid, e.g., 4,4 - bis(4 - hydroxyphenyl) pentanoic acid, at temperatures ranging from about 175–275° C. for periods ranging from 1–4 hours and more preferably at 220–230° C. for periods of 1 to 2 hours under a vacuum of about 24″ of mercury.

Example I 4,4 - bis(4 - hydroxyphenyl) (2 moles) pentanoic acid _____ 590
Hexamethylene diamine (1.6 moles) _____ 186

Approximately 590 grams (2 moles) of the 4,4 - bis (4 - hydroxyphenyl) pentanoic acid was used to amidify 186 grams (1.6 moles) of hexamethylene diamine. The two reactants were heated with stirring under an atmosphere of nitrogen gas to a temperature of about 175° C. The nitrogen supply was removed and a vacuum was applied slowly to remove the water as the amides were formed. The temperature was slowly raised to about 220° C. and was held at this temperature for a period of about two hours. The final material was a dry, dark liquid which, upon cooling, formed a glassy, hard product which was crushed and powdered.

The diphenolic acids, in addition to 4,4 - bis(4 - hydroxyphenyl) pentanoic acid, may include the condensation products of levulinic acid with a phenol, a substituted phenol and mixtures thereof. Thus, it is possible to use diphenolic acids wherein the phenolic nuclei of the acid may be substituted with other groups so long as they do not interfere in the subsequent reaction with the polyfuncional phenol and aldehyde. Of the various diphenolic acids, the preferred is 4,4 - bis(4 - hydroxyphenyl) pentanoic acid which is a polyfunctional acid in that it contains two phenolic hydroxyl groups, four condensable hydrogens, one reactive carboxyl group and an alpha alkyl hydrogen atom.

The amidification of the polyamine in accordance with this invention may be illustrated by the following formula:

dehyde per mole of reactive phenolic constituent in the mixture of the diphenolic acid amides and polyfunctional phenols. More specifically, the diphenolic resin compositions of this invention are prepared by condensing approximately 5–50% by weight of the diphenolic amides with approximately 50–95% by weight of at least one polyfunctional phenol with an effective amount of paraformaldehyde, at a temperature ranging up to about 100° C., e.g., 90–95° C., in the presence of an alkaline catalyst until a condensed product is obtained.

In preparing the diphenolic resins by condensing the diphenolic acid amides with formaldehyde and one or more polyfunctional phenols, any of the known phenols may be used and include, for example, monohydroxy benzene, alkyl-substituted mono- and diphenols, e.g., cresol, polynuclear phenols, e.g., bisphenol A, and the polyhydric phenols, such as resorcinol. The formaldehyde may be used as an aqueous or alcohol solution but preferably as paraformaldehyde, and is added to a mixture of the polyfunctional phenols and diphenolic acid amides and condensed at temperatures ranging up to 100° C. and more specifically, at about 95° C. with the removal of water until the condensed product is attained. The amount of formaldehyde employed will range from about 0.8 to 2.5 moles of formaldehyde per mole of reactive phenolic

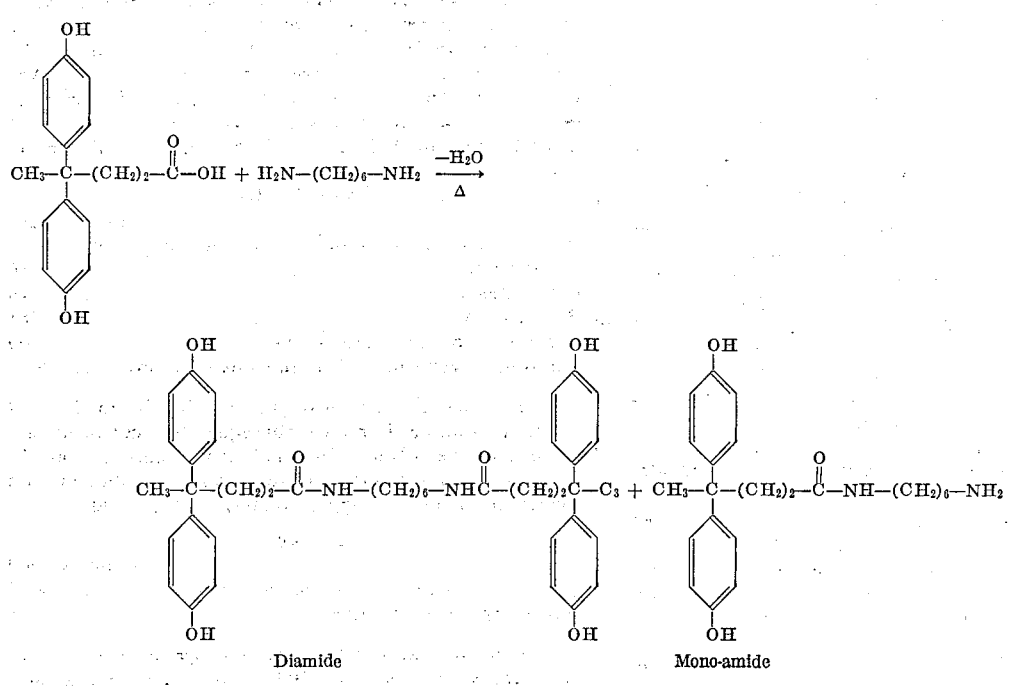

Diamide    Mono-amide

It should be noted from the above formula that the hexamethylene diamine when used in an excess, e.g., 100% in excess of the amount stoichiometrically needed to react both of the primary amino groups, a product was obtained which was a mixture of the diamide and the mono-amino amide. The relative proportion of the mono- and diamides will vary in accordance with the amount of excess of polyamine used in the amidification reaction.

The diphenolic acid amide comprising both the mono-amino amide and the diamide adducts are used in combination with at least one polyfunctional phenol and formaldehyde, to obtain a condensation product which may be used for preparing a thermosetting coating. The diphenolic acid amides are combined with the polyfunctional phenols in an amount ranging from about 5–50% by weight and more preferably in an amount ranging from about 20–30% by weight with the polyfunctional phenol ranging from about 50–95% by weight and more preferably 70–80% by weight. The amount of formaldehyde will vary from about 0.8 to 2.5 moles of formalgroup with the preferred ratio being approximately 1.2 moles of formaldehyde per mole of reactive phenolic group.

More important, heretofore in preparing a mixture of the phenols with the diphenolic acid amides for preparation of the diphenolic resins, it has been difficult to obtain a uniform mixture of the reactants. Thus, it was unexpectedly discovered that by wetting the diphenolic amides with certain types of materials, hereinafter referred to as dispersing agents, prior to its being mixed with the polyfunctional phenol, it was possible then to obtain a homogeneous mixture which could be reacted uniformly without any difficulty. If, however, the prewetting of the acid amides was omitted, it was found that clumping or balling of the product occurred which resulted in failure to chemically unite all of the amide into the structure of the phenolic resin. Without the dispersant, it was found that in most cases the amides would be merely carried along in a dissolved state. To avoid this problem and to form a homogeneous mixture of the reactants, the use of a dispersing agent, e.g., alcohols and hydrocarbons, was found to be essential when used in effective amounts.

The materials which may be used as dispersing agents for this purpose must be non-solvents for the diphenolic acid amides, must be chemically inert with respect to the reactants and reaction products, and are preferably miscible with the resulting phenolic resin solution. These materials include the $C_1$ to $C_8$ monohydric aliphatic alcohols, the $C_6$ to $C_9$ straight-chain aliphatic hydrocarbons, mineral spirits and various aromatic solvents, such as toluene or xylene, Solvesso 150, high flash naphtha, and mixtures thereof. In addition, some ketones may be used and include such compounds as methyl ethyl ketone. Also, chlorinated hydrocarbons may be used, e.g., chloroform, carbon tetrachloride and ethylene dichloride. The preferred dispersants, however, include the aliphatic alcohols and the aliphatic or aromatic hydrocarbons and may be used in amounts ranging from about 0.6 to about 2.5 and more preferably in amounts ranging from 0.9 to 1.5 ml. of dispersant per gram of the diphenolic acid amide.

The following examples are merely illustrations of the various procedures and products which can be obtained in accordance with this invention.

Example II

| | Grams |
|---|---|
| Diphenolic acid amides of Example I | 327 |
| Ortho-cresol (practical grade) | 432 |
| Bisphenol-A [$H_3C)_2C(C_6H_4OH)_2$] | 570 |
| Paraform (flake) | 400 |
| Aqueous ammonia hydroxide catalyst (28% solution) | 121 |

The above diphenolic resin was prepared by wetting the diphenolic acid amides with 500 mls. of methyl amyl alcohol (4-methyl 2-pentanol) in a 5-liter, 3-neck flask fitted with a stirrer, a thermometer and a condenser and placed on a steam bath. Following the wetting of the acid amides with the methyl amyl alcohol, the ortho-cresol was added followed by the addition of a Bisphenol-A and the paraform. Heat was rapidly applied by the steam bath until the temperature of the reactants reached approximately 65° C., at which point the aqueous ammonia solution was added to the reactants. The heat was continued until the exotherm reached was about 90° C. and the temperature was maintained at about 95° C. for about one hour, at which point the condensation reaction was substantially clear.

Further heating of the condensation reaction product was then carried out by temperatures of 90–95° C. until the resin was advanced to a strokes cure of about 40 seconds, measured at 150° C. The strokes cure test is a practical method for measuring the degree or extent of the condensation reaction between phenolic bodies and formaldehyde. The test consists of pouring about 0.5 ml. of resin containing the phenolic bodies and formaldehyde on a polished hot plate surface heated to 150° C. The resin is stroked slowly with a spatula until the resin gels. The time in seconds required to gel is the "stroked cure." About 1,000 mls. of diacetone alcohol and about 200 mls. of toluene were then added to the batch and a vacuum was used to dehydrate the product at a temperature of about 70° C. During the vacuum dehydration, only water is removed with the solvents being automatically returned to the reactor. The presence of toluene in this particular instance is used during the dehydration since the boiling point of diacetone alcohol is too high to allow distillation at these temperatures even under a vacuum. Following the dehydration, the resluting diphenolic resin in toluene and diacetone alcohol was further heated to about 90–95° C. until the resin was advanced to a strokes cure of 32 seconds measured at 150° C. Thereafter, additional diacetone alcohol was added so as to bring the solid content of the solution to about 50% by weight.

In the two-stage advancement of the strokes cure described above, the strokes cure should be advanced to within the range of about 40–60 seconds measured at 150° C. in the predehydration first stage, and to within the range of about 20–35 seconds measured at 150° C. in the post-dehydration second stage. The final solids content of the diphenolic resin solution should be within the range of approximately 30–60% by weight, and preferably about 50% by weight. For the purpose of adjusting the final solids content of the solution, other solvents, such as butyl Cellosolve or methyl isobutyl ketone, may be used in place of or in admixture with the diacetone alcohol.

These diphenolic resins can be exemplified as follows:

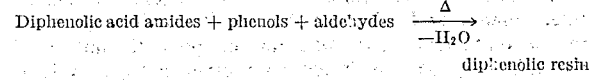

Diphenolic acid amides + phenols + aldehydes $\xrightarrow[-H_2O]{\Delta}$ diphenolic resin Example III

| | Parts-by-weight |
|---|---|
| 4,4-bis(4-hydroxyphenyl) pentanoic acid | 286.3 |
| Propane diamine | 53.7 |

The above reactants were heated, together with stirring, at a temperature of about 200° C. at which point a vacuum was applied to remove the water of condensation. The total reaction time was approximately two hours at temperatures of about 180–220° C. until the reaction was completed. The product was poured into a Pyrex dish, while in the fluid state, cooled and crushed in a mortar and pestle. The final reaction product had a dark-brown color and an average amine value of 104.9. Approximately 163.5 grams of the propane diamine-pentanoic acid product was wetted with about 250 mls. of methyl amyl alcohol and used to prepare a diphenolic resin as follows:

Example III-A

| | Parts-by-weight |
|---|---|
| Propane diamine-pentanoic acid reaction product (prewetted) | 216 |
| Ortho-cresol | 216 |
| Bisphenol-A | 285 |
| Paraform (paraformaldehyde) | 200 |
| Ammonia hydroxide (28% aqueous solutions) | 60.5 |

The diphenolic resin was prepared by the method set forth in Example II and was subsequently azeotroped with toluene as the solvent. The final strokes cure at 150° C. was about 20 seconds. The resin was then diluted with diacetone alcohol to approximately 33.8% solids.

Example IV

| | Parts-by-weight |
|---|---|
| 4,4-bis(4-hydroxyphenyl) pentanoic acid | 286.3 |
| Tetraethylene pentamine | 143.9 |

The above reactants were heated together with stirring to a temperature of about 200° C. at which point a vacuum was applied for the removal of the water of condensation. The reaction time ranged for approximately two hours at about 180–220° C. until the reaction was completed. The product was poured in the liquid state into a Pyrex dish, cooled and then crushed in a mortar and pestle. The product had a medium-brown color. Approximately 81.8 grams of the tetraethylene pentamine-pentanoic acid product was wetted with 125 mls. of methyl amyl alcohol and used for preparing the following diphenolic resin in accordance with the method set forth in Example II.

Example IV-A

| | Parts-by-weight |
|---|---|
| Pentamine-pentanoic acid product (wetted) | 81.8 |
| Ortho-cresol | 108 |
| Bisphenol-A | 142.5 |
| Paraformaldehyde | 100 |
| Ammonia hydroxide (28% solution—aqueous) | 30.3 |

Toluene was used as the azeotropic solvent and the final product had a strokes cure at 150° C. of about 32 seconds. The product was diluted with diacetone alcohol to 49.2% solids.

Example V

| | Parts-by-weight |
|---|---|
| 4,4-bis(4-hydroxyphenyl) pentanoic acid | 286.3 |
| p-Phenylene diamine | 82.2 |

The above reactants were heated together with stirring to a temperature of about 200° C. at which point a vacuum was applied to remove the water of condensation. The reaction time was continued for about two hours at a temperature ranging from about 180–220° C. The product obtained was poured into a Pyrex dish, while in the fluid state and cooled, then subsequently crushed in a mortar and pestle. The reaction product had a dark-purple color and had an average amine value of 95.8. Approximately 81.8 grams of the p-phenylene diamine-pentanoic acid product was wetted with about 125 mls. of methyl amyl alcohol and used for preparing the following diphenolic resin.

Example V-A

| | Parts-by-weight |
|---|---|
| Paraphenylene diamine-pentanoic acid compound (wetted) | 81.8 |
| Ortho-cresol | 108 |
| Bisphenol-A | 142.5 |
| Paraformaldehyde | 100 |
| Ammonia hydroxide (28% aqueous solution) | 30.3 |

The diphenolic resin was prepared by condensing the components at a temperature ranging up to about 100° C. as more specifically set forth in Example II. Toluene was used as the azeotropic solvent and the final product had a strokes cure at 150° C. of 32 seconds. The product was diluted with diacetone alcohol to about 47% solid. The color of the resin solution was purple.

Example VI

| | Parts-by-weight |
|---|---|
| Hexamethylene diamine-pentanoic acid reaction product (wetted) | 63.6 |
| Ortho-cresol | 70 |
| Bisphenol-A | 107 |
| Paraformaldehyde | 108 |
| Ammonia hydroxide (28% aqueous solution) | 30.3 |

The hexamethylene diamine-pentanoic acid reaction product was wetted with 150 mls. of methyl amyl alcohol and mixed with the other reactants in accordance with the process of Example II. Toluene was used as the azeotropic solvent and the final product had a strokes cure at 150° C. of 30 seconds. Approximately 200 mls. of butyl Cellosolve with diacetone alcohol were used to dilute the resin to a solid content of about 41.7%.

Example VII

| | Parts-by-weight |
|---|---|
| Hexamethylene diamine-pentanoic acid reaction product | 81.8 |
| Ortho-cresol | 108 |
| Bisphenol-A | 142.5 |
| Paraformaldehyde | 100 |
| Ammonia hydroxide (28% aqueous solution) | 30.3 |

The hexamethylene diamine-pentanoic acid product was wetted with about 125 mls. of toluene and reacted with the other constituents to a diphenolic resin in accordance with the process set forth in Example II. Dehydration of the product was carried out after addition of about 200 mls. of diacetone alcohol when the strokes cure had been advanced to 43 seconds at 150° C. The final strokes cure at 150° C. was 31 seconds. Approximately 200 mls. of butyl Cellosolve was added to the product until the solid content was approximately 54.4%.

DIPHENOLIC RESIN-EPOXY RESIN COATINGS

Example VIII

A diphenolic resin-epoxy resin coating composition was prepared by dissolving Epon 1009 (a reaction product of bis(4-hydroxyphenyl) isopropylidene with epichlorohydrin) in the following manner:

| | Parts-by-weight |
|---|---|
| Epon 1009 | 1200 |
| Methyl isobutyl ketone | 1200 |
| Butyl Cellosolve | 1200 |

The Epon resin was dissolved in the solvents by heating with stirring on a steam bath. The solid contents of the solution were approximately 33.3%. The diphenolic resins were prepared as in Examples II, III-A, IV-A, V-A, VI and VII, and blended with the above Epon 1009 solution in such proportions that the final mixture contained about 50% by weight of the diphenolic resin and about 50% by weight of the Epon resin, based on total resin solids. In addition, pine oil was added to the mixture in an amount of about 6% by weight of the total resin. The pine oil facilitated the wetting of the tinplate with the resin solution and may be referred to as a flow agent. Samples of tinplate were prepared with each of the five different diphenolic-Epon resin coating compositions and baked for about ten minutes at 400° F. The coatings were applied in an amount ranging from about 3–4 mls. per square inch of tinplate. The films obtained were hard, tough and adherent to the metal surface. The coated surface had a gold color and had fabricating properties which were particularly excellent in the punched can-end evaluation test.

The comparative amine values of the diphenolic acid amides used in preparing the diphenolic resins of the coatings were as follows:

TABLE I

| | Amine values of diamine derivatives of pentanoic acid | | |
|---|---|---|---|
| | Propane diamine | p-Phenylene diamine | Hexamethylene diamine |
| | 107.0 | 96.1 | 70.9 |
| | 105.0 | 96.5 | 70.5 |
| | 104.3 | 96.3 | 71.4 |
| | 103.9 | 95.5 | 71.5 |
| | 104.2 | 94.5 | 71.0 |
| Average | 104.9 | 95.8 | 71.1 |
| Range | 103.9–107.0 | 94.5–96.5 | 70.5–71.5 |
| Titration solvent | Methanol | (¹) | Methanol |
| Titrant | (²) | (³) | (²) |

¹ Glacial acetic acid.
² Aq. .1 N HCl.
³ .1 N HClO₄ in glacial acetic acid.

It can be seen from the above data that the high amine values indicate the large amount of unreacted primary amine groups present in the diphenolic acid amides prepared by reacting the 4,4-bis-(4-hydroxyphenyl) pentanoic acid with the various polyamines. The amine value is defined as the number of milligrams of potassium hydroxide equivalent to the free amine groups contained in a one-gram sample. The amine values of the three different diamines of the diphenolic acid were determined by non-aqueous potentiometric titrations.

The epoxy resin used in combination with the diphenolic resins for preparing the coating compositions of this invention include those epoxy resins which contain terminal epoxide groups and alcoholic hydroxyl groups attached to the aliphatic portion of the resin. Epoxide compounds which may be used include the polyepoxide polyesters which may be prepared by esterifying tetrahydrophthalic anhydride with a glycol and epoxidizing the product of the esterification reaction. Other epoxies which may be used include the epoxidized unsaturated natural oil-acid esters including the unsaturated vegetable, animal and fish oil esters. These epoxides are prepared by reacting these esters with various per-acids. The unsaturated oil acid esters are long-chain aliphatic acid esters containing from about 15–22 carbon atoms which may be esterified with monohydric alcohols, such as methyl or ethyl alcohol or with polyhydric alcohols such as glycerol. In addition, mixed esters of polycarboxylic acids and long-chain unsaturated natural oil acids with polyhydric alcohols may be used. These epoxidized oil acid esters may contain from about 1–10 epoxide groups per molecule. Other aliphatic polyepoxides include the polyepoxyalkyl ethers prepared from polyhydric alcohols. These epoxides are prepared by reacting, for example, an aliphatic polyhydric alcohol with epihalohydrin in the presence of a catalyst and then dehydrohalogenating the product to obtain the epoxide. Specific examples include the epoxides obtained by reacting glycerol with epichlorohydrin in the presence of a boron trifluoride catalyst followed by dehydrohalogenation with sodium aluminate.

Still other polyepoxides which may be used for purposes of this invention are the epoxides referred to as complex-resinous polyepoxides and are commercially available as "Epon Resins" marketed by the Shell Chemical Corporation. These products may be prepared by condensing, in the presence of an alkali material, bis(4-hydroxyphenyl) isopropylidene with an excess of epichlorohydrin. A number of epoxides which may be used for purposes of this invention may be found also in U.S. Patents 2,538,072 and 2,712,000.

The epoxy resins, together with the diphenolic resins, are dissolved in one or more organic solvents including diacetone alcohol, alcohol, butyl alcohol, amyl alcohol, ethyl and butyl Cellosolve, Cellosolve acetate and mixtures thereof with other aromatic or aliphatic solvents including toluene and xylene.

In addition, in order to prevent the coating from breaking away from the metal surface or to enhance the wetting properties of the metal surface, it is desirable to include in the coating composition various flow agents which include pine oil, silicone oils and polyvinyl butyral. Various inorganic pigments, such as titanium dioxide, aluminum powder or zinc oxide, can be added also for pigmentation purposes.

The coating compositions comprising a combination of the epoxy resin and the diphenolic resin may be applied to various surfaces and particularly metal surfaces in an amount ranging, for example, between 3–4 mgs. of coating per square inch of metal surface. The solid content of the coating compositions may range from about 20–40% and more preferably from about 25–35%. The specific solids content of any one coating, however, will depend upon the particular epoxy resin and diphenolic resin being used and the type and amount of pigments or other components normally added to coating compositions of this kind.

The coatings are subsequently cross-linked or baked at temperatures ranging from about 350–500° F. and more preferably at temperatures from 380–420° F. for periods of time ranging from about 3–25 minutes. A still more preferred baking or curing temperature ranges from about 400–420° F. for periods of 8–10 minutes.

The coating compositions of this invention have wide utility, particularly for coating metal surfaces, such as tinplate, which is used in metal containers which can be used for carrying corrosive materials including wax emulsions, paint emulsions, anti-freeze, lubricating oils, barbecue sauces, spinaches and other vegetables. Thus, it has been found in the past that highly acidic or even alkaline materials have created a problem in the container art. Corrosion of the metal, particularly at the seams, has been an outstanding problem. Thus, to overcome these problems and to continue the employment of metal as containers, it is necessary to find a coating material and particularly a thermosetting coating material which can be easily applied to form a hard, flexible, adherent film. It is essential that the coating adheres to the metal even after being subjected to the various forming processes, including cutting, bending and other forming operations which must be carried out in the normal manufacturing of containers. In those instances where the coating is not flexible or not adherent to the metal surface, the forming operations will obviously cause the coating to crack and peel away from the metal, thus exposing same to corrosive materials. It has been found that the coating composition of this invention is completely satisfactory for this purpose in that it is corrosive-resistant and highly adherent to the metal, such as tinplate, blackplate, aluminum and other metals normally used for the preparation of containers.

While this invention has been described with respect to a number of specific embodiments, it is obvious that there are other modifications and variations which may be employed without departing from the true spirit of the invention except as more specifically pointed out in the appended claims.

We claim:
1. A method of preparing a diphenolic acid-resin coating composition which comprises the sequential steps of:
    (1) preparing a diphenolic acid-amide by reacting a diphenolic acid and a polyamine containing two primary amine groups per molecule, the polyamine being present in the reaction mixture in an amount ranging from about 5% to about 100% by weight in excess of the stoichiometric amount required to completely react all of the primary amine groups;
    (2) wetting the diphenolic acid-amide with a dispersing agent, the dispersing agent being an organic liquid characterized as a non-solvent for the diphenolic acid-amide which is chemically inert with respect to the reactants and reaction products used in the process, the dispersing agent being present in amounts ranging from about 0.6 to 2.5 milliliters per gram of the diphenolic acid-amide;
    (3) condensing about 5% to about 50% by weight of the wetted diphenolic acid-amide with about 50% to about 95% by weight of a mixture of formaldehyde and at least one polyfunctional phenol selected from the group consisting of monohydroxy benzene, polyhydric phenols, alkyl-substituted mono- and diphenols, and polynuclear phenols, the formaldehyde being present in an amount of about 1.0 to 2.5 moles of formaldehyde per mole of reactive phenolic group, at a temperature ranging up to about 100° C. with the removal of water until the condensed product is obtained.

2. The method of claim 1 further characterized in that the diphenolic acid-amides are wetted with a dispersing agent selected from the group consisting of alcohols and aromatic and aliphatic hydrocarbons.

3. The method of claim 1 further characterized in that the diphenolic acid is 4,4-bis(4-hydroxyphenyl) pentanoic acid.

4. The method of claim 1 further characterized in that the formaldehyde is paraformaldehyde.

5. The method of claim 2 further characterized in that the polyfunctional phenol is a combination of cresol and bisphenol.

6. The method of claim 1 further characterized in that the polyamine is hexamethylenediamine.

7. The method of claim 1 further characterized in that the polyamine is propane diamine.

8. The method of claim 1 further characterized in that the polyamine is paraphenylene diamine.

9. The method of claim 1 further characterized in that the polyamine is ethylene diamine.

10. The method of claim 1 further characterized in that the polyamine is diethylene triamine.

11. The method of claim 1 further characterized in that the formaldehyde is an aqueous solution of formaldehyde and the condensation of the diphenolic acid-amides with the polyfunctional phenol takes place in the presence of an alkaline catalyst.

(References on following page)

References Cited

UNITED STATES PATENTS

| | | | |
|---|---|---|---|
| 2,907,728 | 10/1959 | Greenlee | 260—559 |
| 2,907,729 | 10/1959 | Greenlee | 260—19 |
| 2,933,517 | 4/1960 | Greenlee | 260—559 |

FOREIGN PATENTS 827,703  2/1960  Great Britain.

MORRIS LIEBMAN, *Primary Examiner.*

J. E. CALLAGHAN, *Assistant Examiner.*